(12) United States Patent
Kim et al.

(10) Patent No.: US 12,453,938 B2
(45) Date of Patent: Oct. 28, 2025

(54) FILTER FRAME AND AIR PURIFIER COMPRISING SAME

(71) Applicant: COWAY CO., LTD., Gongju-si (KR)

(72) Inventors: Jhe Hong Kim, Seoul (KR); Yu Young Nam, Seoul (KR); Jun Hyoung Bae, Seoul (KR); Ki Soo Kim, Seoul (KR)

(73) Assignee: COWAY CO., LTD., Gongju-si (KR)

( * ) Notice: Subject to any disclaimer, the term of this patent is extended or adjusted under 35 U.S.C. 154(b) by 388 days.

(21) Appl. No.: 18/007,342

(22) PCT Filed: Jul. 29, 2021

(86) PCT No.: PCT/KR2021/009875
§ 371 (c)(1),
(2) Date: Jan. 30, 2023

(87) PCT Pub. No.: WO2022/025663
PCT Pub. Date: Feb. 3, 2022

(65) Prior Publication Data
US 2023/0271126 A1    Aug. 31, 2023

(30) Foreign Application Priority Data
Jul. 31, 2020    (KR) .......................... 10-2020-0096361

(51) Int. Cl.
*B01D 46/00* (2022.01)
*B01D 46/12* (2022.01)

(52) U.S. Cl.
CPC ..... *B01D 46/0016* (2013.01); *B01D 46/0002* (2013.01); *B01D 46/0039* (2013.01); *B01D 46/12* (2013.01)

(58) Field of Classification Search
CPC ............ B01D 46/0002; B01D 46/0005; B01D 46/0016; B01D 46/0039; B01D 46/12; F24F 8/108
See application file for complete search history.

(56) References Cited

U.S. PATENT DOCUMENTS

| | | |
|---|---|---|
| 7,445,710 B2 | 11/2008 | Stankowski et al. |
| 2010/0050581 A1 | 3/2010 | Schuld |

(Continued)

FOREIGN PATENT DOCUMENTS

| | | |
|---|---|---|
| CN | 207641181 U | 7/2018 |
| JP | 5-231685 A | 9/1993 |

(Continued)

OTHER PUBLICATIONS

Japanese Office Action issued Feb. 13, 2024 in Japanese Patent Application No. 2023-505763 (with English Translation), 4 pages.

(Continued)

*Primary Examiner* — Robert Clemente
(74) *Attorney, Agent, or Firm* — Oblon, McClelland, Maier & Neustadt, L.L.P.

(57) ABSTRACT

A filter frame includes a support supporting a filter member, and the support includes a first support and a second support which are rotatably connected. Each of the first and second support includes a body part including a first vertical member, a horizontal member having one end perpendicularly connected to the first vertical member, and a second vertical member connected to the other end of the horizontal member, a cylindrical shaft part connected to the first vertical member, a rotating part connected to the second vertical member to surround a portion of the shaft part, a locking part provided on one of the first vertical member and the shaft part, and an engaging part provided on one of the second vertical member and the rotating part and engaged and fixed to the locking part. The rotating part of the second support is coupled to the shaft part.

5 Claims, 14 Drawing Sheets

(56) References Cited

U.S. PATENT DOCUMENTS

| | | |
|---|---|---|
| 2015/0267927 A1 | 9/2015 | Zhang et al. |
| 2018/0221805 A1 | 8/2018 | Bae et al. |
| 2018/0304184 A1 | 10/2018 | Gunnefur |

FOREIGN PATENT DOCUMENTS

| | | |
|---|---|---|
| JP | 2002-95724 A | 4/2002 |
| JP | 2003-24730 A | 1/2003 |
| JP | 2012-148259 A | 8/2012 |
| JP | 2018-183771 A | 11/2018 |
| KR | 10-2017-0046325 A | 5/2017 |
| KR | 10-2018-0119114 A | 11/2018 |

OTHER PUBLICATIONS

International Search Report issued Nov. 8, 2021 in PCT/ KR2021/ 009875, filed on Jul. 29, 2021, 3 pages.

FILTER FRAME AND AIR PURIFIER COMPRISING SAME

TECHNICAL FIELD

The present disclosure relates to a filter frame and an air purifier including same.

BACKGROUND

In general, an air purifier is a device for sucking polluted indoor air, and filtering out dust odor particles, and the like contained in the air through a filter to purify the air into clean air. Such an air purifier may purify indoor air by sucking in and purifying the surrounding polluted air, and then discharging the purified clean air to the outside of the air purifier.

Meanwhile, the air purifier may include a filter for filtering out dust odor particles, and the like contained in the air introduced into the air purifier. The filter may have various shapes depending on the type of the air purifier. For example, the filter may be provided in a cylindrical shape, a rectangular parallelepiped shape, or the like.

However, the filter having the above-described shape occupies a relatively large volume in the process of transporting, which incurs a high cost for transporting the filter. In addition, in recent years, the demand for a filter having a large area is increasing in order to purify air in a large space, and the volume occupied by the filter during transportation is increasing. Accordingly, a folding filter for reducing the volume during transportation of the filter and a filter frame for supporting the folding filter are being developed.

U.S. Patent Application Publication No. 2018/0221805 "Air Purifier" of the present applicant and U.S. Patent Application Publication 2018/0304184 "Foldable Air Filter Unit" of Blueair AB disclose a foldable filter and a filter frame capable of reducing the volume upon transportation of the filter. However, since the conventional filter frame has a hinge structure for folding the filter frame, it is difficult to keep the filter frame in an unfolded or folded state without a special device. In particular, it is difficult to transport the filter frame when it becomes unfolded arbitrarily from the folded state, and the efficiency of an air purifier may decrease when the filter frame becomes folded arbitrarily while the air purifier is being used. In addition, when the filter frame rotates arbitrarily, the filter frame may rotate excessively over a predetermined range due to inertia caused by rotation, which increases the risk of damage to the filter frame.

In addition, when the filter frame is separately provided with a means for preventing the filter frame from being folded or unfolded arbitrarily, the size of the filter frame may become too large and the manufacturing cost may increase. Further, when the means for preventing free rotation of the filter frame is large or has a complex configuration, it is inconvenient to be mounted to the air purifier.

Accordingly, there is a need for a filter frame with a simple structure, which is capable of preventing the filter frame from being folded or unfolded arbitrarily while reducing the manufacturing cost of the filter frame.

PRIOR ART DOCUMENT (Patent Document 1) US Patent Application Publication 2018/0221805 (published on Aug. 9, 2018)

(Patent Document 2) US Patent Application Publication 2018/0304184 (Published on Oct. 25, 2018)

DETAILED DESCRIPTION OF INVENTION

Technical Problems

In view of the above, embodiments of the present disclosure provide a filter frame that can be easily folded or unfolded by a user.

In addition, embodiments of the present disclosure provide a filter frame capable of minimizing damage to the filter frame while preventing a decrease in the efficiency of an air purifier by preventing the filter frame from being arbitrarily folded or unfolded.

Further, embodiments of the present disclosure provide a filter frame capable of reducing the manufacturing cost of the filter frame by simplifying the structure thereof.

Technical Solution

In accordance with an aspect of the present disclosure, there is provided a filter frame including: a support supporting a filter member for air filtration, wherein the support includes a first support and a second support which are connected to each other to be rotatable with respect to each other, and wherein each of the first support and the second support includes: a body part including a first vertical member extending in an up-down direction, a horizontal member having one end connected to the first vertical member to be perpendicular thereto, and a second vertical member connected to the other end of the horizontal member and extending in the up-down direction; a cylindrical shaft part connected to the first vertical member at a position between an upper end and a lower end of the first vertical member and extending in the up-down direction; a rotating part connected to the second vertical member at a position between an upper and a lower end of the second vertical member and formed to surround at least a portion of the shaft part; a locking part provided on at least one of the first vertical member and the shaft part; and an engaging part provided on at least one of the second vertical member and the rotating part, and formed to be engaged and fixed to the locking part, wherein the rotating part of the second support is rotatably coupled to the shaft part of the first support, and wherein the locking part of the first support and the engaging part of the second support are engaged and fixed to each other to prevent the first support and the second support from freely rotating when the horizontal member of the first support and the horizontal member of the second support form a predetermined angle.

Further, there may be provided the filter frame in which the first support includes a plurality of the first supports and the second support includes a plurality of the second supports, the plurality of first supports and the plurality of second supports are continuously connected in such a manner that the shaft part of one of the first support and the second support and the rotating part of the other of the first support and the second support are rotatably engaged to each other, and when each of the plurality of supports is rotated with respect the support adjacent thereto to form an angle less than a straight angle with respect to the adjacent support, the plurality of supports are arranged along a loop-shaped path.

Further, there may be provided the filter frame in which when the first support and the second support are arranged to form the straight angle, when the first support and the second support overlap each other to be arranged in parallel, or when the first support and the second support are arranged so that an internal area of the loop-shaped path is maximized, the locking part of the first support and the engaging part of the second support are engaged and fixed to each other to prevent the first support and the second support from freely rotating with respect to each other.

Further, there may be provided the filter frame in which the locking part of the first support includes a first locking piece formed on a side surface of the body part and a second locking piece formed on an inner surface of the body part, the engaging part of the second support includes a first engaging piece formed on a side surface of the body part and a second engaging piece formed on an inner surface of the body part, when the first support and the second support are arranged to form the straight angle, the first locking piece and the first engaging piece are engaged, and when the first support and the second support overlap each other to be arranged in parallel, the second locking piece and the first engaging piece are engaged.

Further, there may be provided the filter frame in which the locking part of the first support further includes a locking protrusion formed on an outer circumferential surface of the shaft part, and when the first support and the second support are arranged so that the internal area of the loop-shaped path is maximized, the rotating part of the second support is caught on the locking protrusion of the first support to prevent the first support and the second support from freely rotating with respect to each other.

Further, there may be provided the filter frame in which at least a portion of the locking part and the engaging part have a shape of a protrusion or hole.

Further, there may be provided the filter frame in which the locking part of the first support includes a stopper formed on a side surface of the body part, the engaging part of the second support includes a first fixture and a second fixture formed on an outer peripheral surface of the rotating part, and the stopper is engaged with the first fixture when the first support and the second support are arranged so that the internal area of the loop-shaped path is maximized, and engaged with the second fixture when the first support and the second support are arranged at the straight angle.

Further, there may be provided the filter frame in which the locking part of the first support includes a locking projection protruding from a side surface of the shaft part of the first support, the engaging part of the second support includes a first protruding guide, a second protruding guide and a third protruding guide which protrude from an upper surface of the rotating part of the second support, and the locking projection is engaged with the first protruding guide when the first support and the second support are arranged at the straight angle, engaged with the second protruding guide when the first support and the second support are arranged so that the internal area of the loop-shaped path is maximized, and engaged with the third protruding guide when the first support and the second support overlap each other to be arranged in parallel.

Further, there may be provided the filter frame in which the rotating part of the second support has an inner peripheral surface surrounding the shaft part of the first support, the locking part of the first support includes a locking projection protruding from a side surface of the shaft part of the first support, the engaging part of the second support includes a first groove, a second groove and a third groove which are formed on an inner peripheral surface of the rotating part of the second support, and the locking projection is engaged with the first groove when the first support and the second support are arranged at the straight angle, engaged with the second groove when the first support and the second support are arranged such that the internal area of the loop-shaped path is maximized, and engaged with the third groove when the first support and the second support overlap each other to be arranged in parallel.

Further, there may be provided an air purifier for filtering outside air including: the filer frame; a blower for providing blowing force to allow the outside air to flow into the air purifier; and a filter member for filtering the outside air introduced into the air purifier by the blower.

Effect of Invention

According to the embodiments of the present disclosure, a user can easily fold or unfold the filter frame.

In addition, by preventing the filter frame from being arbitrarily folded or unfolded, it is possible to minimize damage to the filter frame while preventing decrease in efficiency of the air purifier.

Further, it is possible to reduce the manufacturing cost of the filter frame by simplifying the structure of the filter frame.

BEST MODE FOR CARRYING OUT THE INVENTION

Hereinafter, a preferred embodiment of the present disclosure for implementing the spirit of the present disclosure will be described in more detail with reference to the accompanying drawings.

However, in describing the present disclosure, detailed descriptions of known configurations or functions may be omitted to clarify the present disclosure.

When an element is referred to as being 'connected' to, 'supported' by, or 'flowed' into another element, it should be understood that the element may be directly connected to, supported by, or flowed into the other element, but that other elements may exist in the middle.

The terms used in the present disclosure are only used for describing specific embodiments, and are not intended to limit the present disclosure. Singular expressions include plural expressions unless the context clearly indicates otherwise.

Terms including ordinal numbers, such as first and second, may be used for describing various elements, but the corresponding elements are not limited by these terms. These terms are only used for the purpose of distinguishing one element from another element.

In the present specification, it is to be understood that the terms such as "including" are intended to indicate the existence of the certain features, areas, integers, steps, actions, elements and/or combinations thereof disclosed in the specification, and are not intended to preclude the possibility that one or more other certain features, areas, integers, steps, actions, elements and/or combinations thereof may exist or may be added.

Furthermore, in the present disclosure, it is to be noted that expressions, such as the upper side and the lower side, are described based on the illustration of drawings, but may be modified if directions of corresponding objects are changed. Meanwhile, in the present specification, an up and down direction may be based on the up and down direction of FIGS. 1 and 3.

Hereinafter, a specific configuration of an air purifier 1 according to one embodiment of the present disclosure will be described with reference to the drawings.

Figure 1:
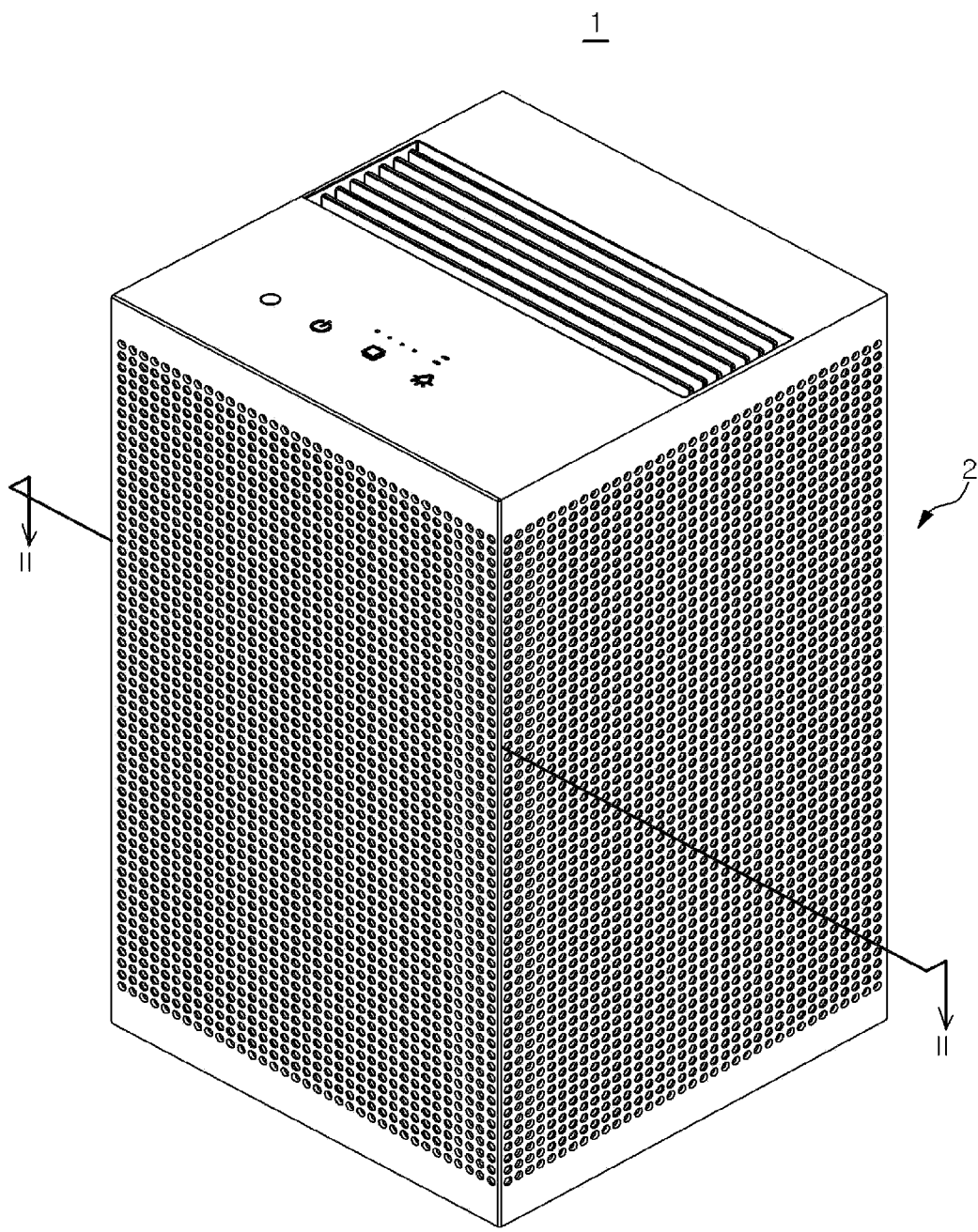
FIG. 1 is a perspective view illustrating an air purifier according to a first embodiment of the present disclosure.
Figure 2:
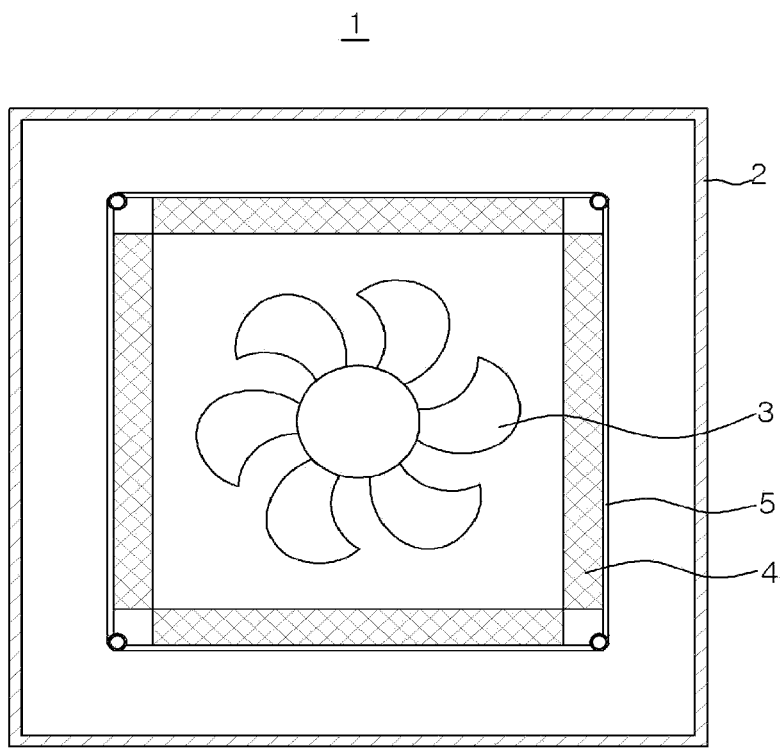
FIG. 2 is a cross-sectional view taken along line II-II of FIG. 1.

Referring to FIGS. 1 and 2, the air purifier 1 according to a first embodiment of the present disclosure can purify polluted air into clean air by filtering out dust, odor particles, and the like in the air introduced into the air purifier 1. In addition, the air purifier 1 can suck outside air into the air purifier and discharge clean air purified from the inside to the outside. The air purifier 1 may include a body 2, a blower 3, a filter member 4, and a filter frame 5.

The body 2 may support the blower 3 the filter member 4 and the filter frame 5, and provide a space in which the blower 3, the filter member 4 and the filter frame 5 are accommodated. The body 2 may include a case surrounding the blower 3, the filter member and the filter frame 5.

The blower 3 may be driven to allow polluted air outside the air purifier 1 to be introduced into the inside of the air purifier 1. The blower 20 may provide blowing force for causing the introduced air to pass through the filter member 4. In addition, the blower 3 may be driven to discharge the clean air to the outside through the filter member 4 inside the air purifier 1. For example, the blower 3 may be disposed at a lower side in the body 2, and may be disposed inside the filter member 4.

The filter member 4 may filter the air introduced from the outside of the air purifier 1 into clean air. For example, the filter member 4 may filter out dust, odor particles, and the like in the air, and may include well-known filters such as, a pre-filter of a mesh structure, a HEPA filter, and an activated carbon deodorization filter (carbon filter). As a specific example, when the filter member 4 is the pre-filter, the pre-filter may be covered on the filter frame 5 to surround the outside and the inside of the filter frame 5. However, this is only an example, and the pre-filter may be provided as a plurality of filters having a square shape and may be supported by a body part 100 in an area surrounded by one or more of a first vertical member 110, a second vertical member 120, and a horizontal member 130 of the filter frame 5.

The filter member 4 may include a plurality of filter members, and the plurality of filter members 4 may be folded or unfolded while being supported by the filter frame 5.

Figure 3:
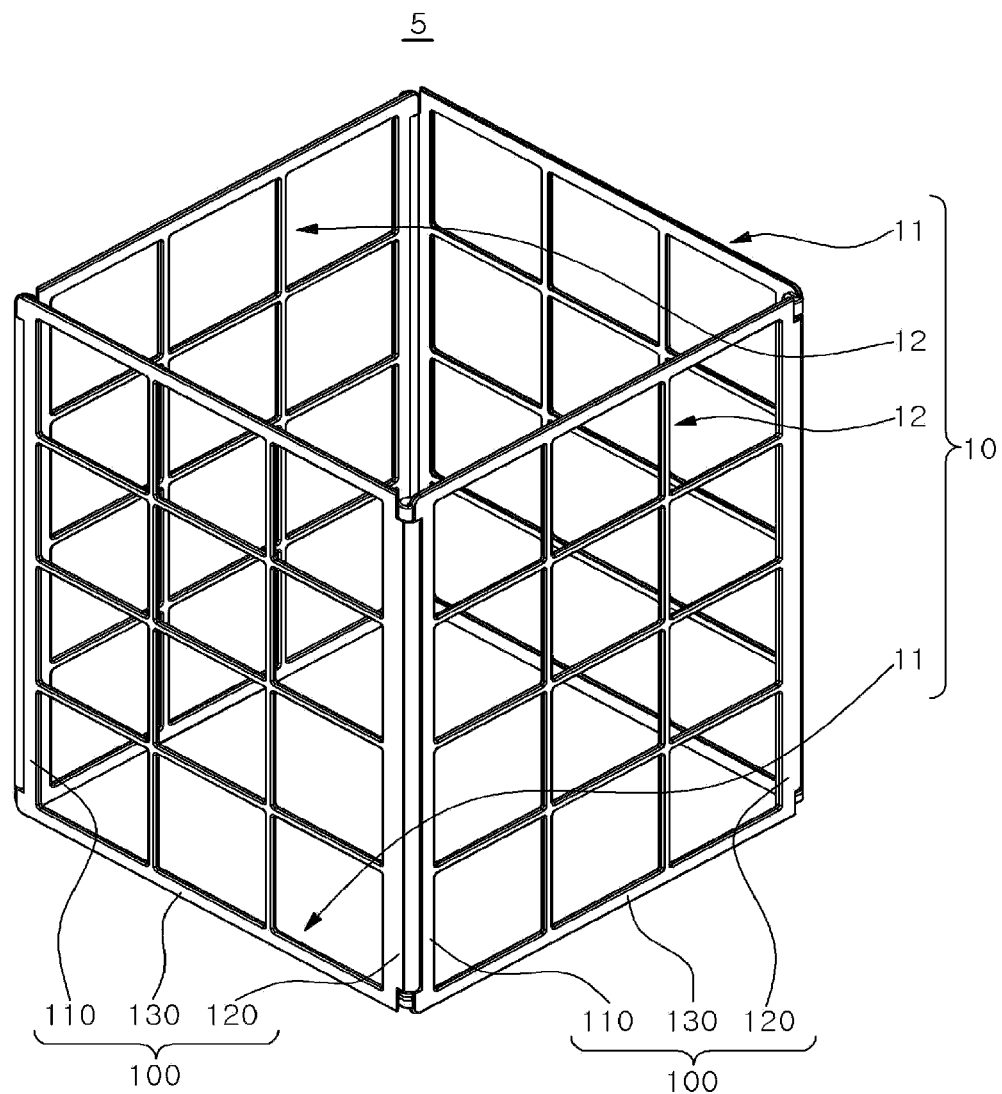
FIG. 3 is a perspective view of a filter frame in FIG. 2.

Referring to FIGS. 2 and 3, the filter frame 5 may support the filter member 4, and may be provided to face the filter member 4. The filter frame 5 may be configured to be folded or unfolded. In addition, the filter frame 5 may include a support 10.

The support 10 may support the filter member 4. The support 10 may include a plurality of supports and the plurality of supports 10 may be provided to be rotatable with respect to each other. In addition, the plurality of supports 10 may include a first support 11 and a second support 12.

The first support 11 and the second support 12 may be connected to each other to be rotatable with respect to each other. Here, the first support 11 and the second support 12 are only for distinguishing each other, and the first support 11 and the second support 12 are not interpreted as being limited to the supports 10 having different shapes or different materials. Accordingly, the first support 11 and the second support 12 may also be understood as the supports 10 having the same material or shape. Each of the first support 11 and the second support 12 may include a body part 100, a shaft part 200, a rotating part 300, a locking part 400, and an engaging part 500.

In addition, the first support 11 may include a plurality of first supports, and the second support 12 may include a plurality of second supports. Hereinafter, the plurality of first supports 11 and the plurality of second supports 12 may be understood as the plurality of supports 10. The plurality of first supports 11 and the plurality of second supports 12 may be continuously connected by rotatably engaging the shaft part 200 of one of the first support and the second support 12 and the rotating part 300 of the other of the first support 11 and the second support 12. For example, the shaft part 200 of the first support 11 may be rotatably coupled to the rotating part 300 of the second support 12 adjacent thereto. In addition, the rotating part 300 of the first support 11 may be rotatably coupled to the shaft part of another second support 12 adjacent thereto. Accordingly, one end of the first support may be provided to be rotatable with respect to the adjacent second support 12, and the other end of the first support 11 may be provided to be rotatable with respect to another adjacent second support 12.

Figure 4:
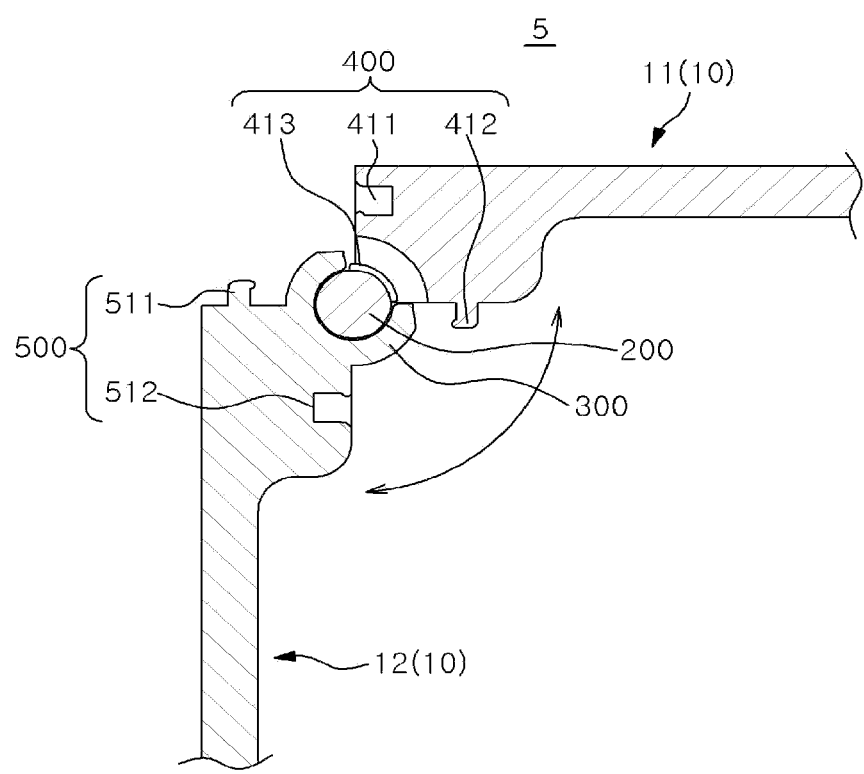
FIG. 4 is a partial cross-sectional view illustrating a state in which a first support and a second support in FIG. 3 are arranged to maximize an internal area of a loop-shaped path.

Meanwhile, referring to FIG. 4, when the plurality of supports 10 are rotated with respect to each other to form an angle smaller than a straight angle with the adjacent supports 10, the plurality of supports 10 may be arranged along a loop-shaped path. Here, the loop-shaped path may be defined as a predetermined path starting from one point and returning to the one point after passing through another point. As a specific example, the plurality of supports 10 may rotate with respect to each other to form a predetermined angle (an, angle of 90° when the number of the supports 10 is 4) with each other. The predetermined angle may be an angle at which an area of an inner space surrounded by the plurality of supports 10 is maximized when viewed from above. In this case, as shown in FIG. 2, the plurality of supports 10 viewed from above may form a rectangular loop. As such, when each of the plurality of supports 10 forms an angle greater than 0° and less than 180° with the adjacent support 10, it is defined as an unfolded state.

Figure 5:
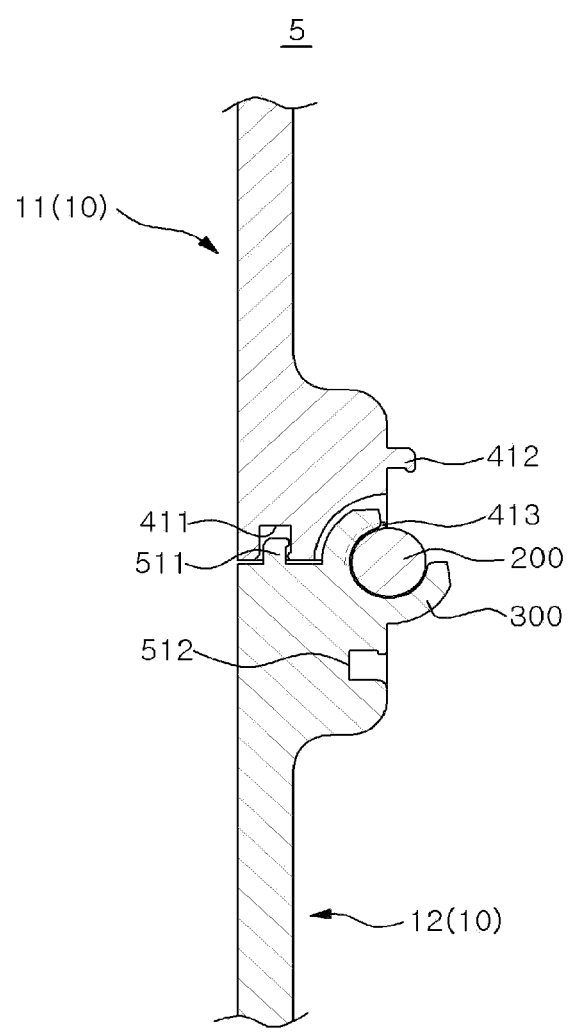
FIG. 5 is a partial cross-sectional view illustrating a state in which the first support and the second support in FIG. 3 are arranged at a straight angle.
Figure 6:
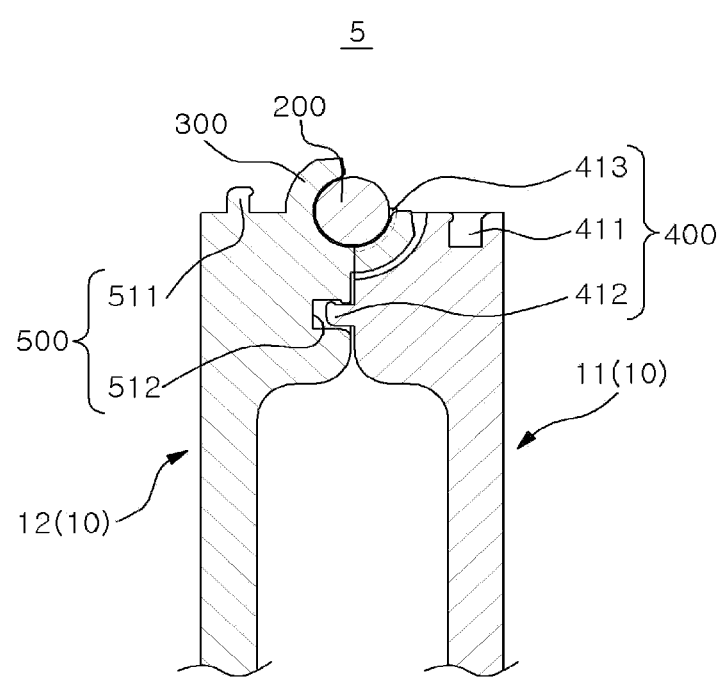
FIG. 6 is a partial cross-sectional view illustrating a state in which the first support and the second support in FIG. 3 are overlapped to be arranged in parallel.

Referring to FIG. 5, the plurality of supports 10 may rotate with respect to each other so that at least two adjacent supports 10 are arranged in parallel. As a specific example, the second support 12 connected to one side of the first support 11 may be unfolded against the first support 11 by rotating with respect to the first support 11. In this case, the first support and the second support 12 are arranged at, a straight angle. That is, an angle between the first support 11 and the second support 12 is 180° In addition, referring to FIG. 6, another second support 12 connected to the other side of the first support 11 may be folded against the second support 12 by rotating with respect to the first support 11. In this case, the first support 11 and the second support 12 overlap each other to be arranged in parallel. That is, an angle between the first support 11 and the second support 12 is 0°. As such, when the angle between each of the plurality of supports 10 and the support 10 adjacent thereto is 0° or 180°, it is defined as a folded state.

The body part 100 may support the shaft part 200, the rotating part 300, the locking part 400, and the engaging part 500. The body part 100 may include a first vertical member 110, a second vertical member 120, and a horizontal member 130.

The first vertical member 110 is formed to extend in an up-down direction and supports the shaft part 200. In addition, the second vertical member 120 is formed to extend in the up-down direction and supports the rotating part 300. However, this is only an example, and the rotating part 300 may be supported by the first vertical member 110 and the shaft part 200 may be supported by the second vertical member 120. Further, the horizontal member 130 has one end connected to the first vertical member 110 and the other end connected to the second vertical member 120.

The shaft part 200 may be rotatably coupled to the rotating part 300. The shaft 200 is connected to the first vertical member 110 at a position between upper and lower ends of the first vertical member 110. In addition, the shaft part 200 may be formed to extend in the up-down direction. The shaft part 200 is formed to correspond to the shape of the rotating part 300, and may, be provided, for example, in a cylindrical shape. Further, the shaft 200 may rotate together with the first support 11.

The rotating part 300 may be rotatably coupled to the shaft part 200. The rotating part 300 is connected to the second vertical member 120 at a position between upper and lower ends of the second vertical member 120. In addition, the rotating part 300 may be formed to extend, in the up-down direction. The rotating part 300 may be provided, for example, in a shape surrounding at least a portion of the shaft part 200. Further, the rotating part 300 may rotate together with the second support 12.

The rotating part 300 may be formed of a material having elasticity. Accordingly, when a predetermined external force is applied to the rotating part 300, the rotating part 300 may be bent and when the external force is released, the rotating part 300 may be restored to its original shape. For example, when the first support 11 and the second support 12 are arranged to have the maximum internal area of the loop-shaped path, the rotating part 300 is caught by a locking protrusion 413 and cannot be rotated further. In, addition, in the case where the rotating, part 300 is caught by the locking protrusion 413, the rotating part 300 is bent when an external force is applied to the first support 11 or the second support 12. In this case, the locking protrusion 413 is inserted between the bent rotating part 300 and the shaft part 200, and the first support 11 and the second support 12 rotate with respect to each other.

Meanwhile, the locking part 400 and the engaging part 500 are included in each of the first support 11 and the second support 12 but hereinafter, for convenience of explanation, the locking part 400 of the first support 11 is described as the locking part 400 and the engaging part 500 of the second support 12 is described as the engaging part 500. Accordingly, the following locking part 400 may be understood as the locking part 400 of the first support 11, and the engaging part 500 may be understood as the engaging part 500 of the second support 12.

The locking part 400 is engaged with the engaging part 500 to prevent the first support 11 and the second support 12 from rotating arbitrarily with each other. For example, when the first support 11 and the second support 12 are arranged at an angle of any one of 0°, 90°, and 180°, the locking part 400 of the first support 11 may be engaged and fixed to the engaging part 500 of the second support 12. In this case, the first support 11 and the second support 12 are fixed at a predetermined angle. The locking part 400 may include a first locking piece 411, a second locking piece 412, and the locking protrusion 413.

Referring back to FIG. 5, when the first support 11 and the second support 12 are arranged at a straight angle, the first locking piece 411 may prevent the first support 11 and the second support 12 from rotating arbitrarily with respect to each other. The first locking piece 411 may be formed on a side surface of the body part 100 to be engaged with a first engaging piece 511 to be described later. For example, the first locking piece 411 may be a hole depressed from a side surface of the first vertical member 110. Here, the side surface of the body part 100 refers to one of the sides of the first support 11 and the second support 12 facing each other when the first support 11 and the second support 12 are arranged at the straight angle.

Referring back to FIG. 6, the second locking piece 412 may prevent the first support and the second support 12 from rotating arbitrarily with respect to each other when the first support 11 and the second support 12 are overlapped to be arranged in parallel. The second locking piece 412 may bel formed on an inner surface of the body part 100 to be engaged with a second engaging piece 512 to be described later. For example, the second locking piece may be a protrusion protruding from an inner surface of the first vertical member 110. Here, the inner surface of the body part 100 refers to one of the sides the first support 11 and the second support 12 facing each other when the first support 11 and the second support 12 are overlapped to be arranged in parallel.

Referring back to FIG. 4, the locking protrusion 413 may prevent the first support 11 and the second support 12 from rotating arbitrarily with respect to each other when the first support 11 and the second support 12 are arranged to have a maximum internal area of the loop-shaped path. The locking protrusion 413 may, be formed on an outer circumferential surface of the shaft 200 to interfere with the rotating part 300. In addition, the locking protrusion 413 may be provided to surround a part of the outer circumferential surface of the shaft part 200.

The engaging part 500 may be engaged with the locking part 400 to prevent the first support 11 and the second support 12 from arbitrarily rotating with each other. For example, when the first support 11 and the second support 12 are arranged at any angle of 0°, 90°, and 180° the engaging part 500 of the first support 11 may be engaged and fixed to the engaging part 400 of the second support 12. In this case, the first support 11 and the second support are fixed at a predetermined angle. The engaging part 500 may include a first engaging piece 511 and a second engaging piece 512.

The first engaging piece 511 may be formed on a side surface of the body part 100 to be engaged with the first locking piece 411. For example, the first engaging piece 511 may be formed corresponding to the shape of the first locking piece 411 or may be a protrusion protruding from a side surface of the second vertical member 120.

The second engaging piece 512 may be formed on an inner surface of the body part to be engaged with the second locking piece 412. For example, the second engaging piece 512 may be formed corresponding to the shape of the second locking piece 412 or may be a hole depressed from an inner surface of the second vertical member 120.

Meanwhile, the locking part 400 and the engaging part 500 may be formed of an elastic material. Accordingly, when a predetermined external force is applied to the locking part 400 and the engaging part 500, the locking part 400 and the engaging part 500 may be bent, and when the external force is released, they can be restored to their original forms.

For example, when the first engaging piece 511 engages with the first locking piece 411, the first engaging piece 511 is bent when an external force is, applied to the first support or the second support 12 so that the first support 11 and the second support 12 have an angle smaller than the straight angle. In this case, the bent first engaging piece 511 is separated from the first locking part 411, and the first support 11 and the second support 12 rotate with respect to each other.

As another example, in the case where the second locking piece 412 engages with the second engaging piece 512, when an external force is applied to the first support 11 or the second support 12 so that the first support 11 and the second support 12 have a predetermined angle, the second locking piece 412 is bent. In this case, the bent second locking piece 412 is separated from the second engaging piece 512, and the first support 11 and the second support 12 are rotated with respect to each other.

As described above, in the present specification, it is described that the first locking piece 411 is provided as a hole, and the first engaging piece 511 is provided as, a protrusion. However, this is only an example, and the first locking piece 411 may be provided as a protrusion, and the first engaging piece 511 may be provided as a hole. In addition, the second locking piece 412 may be provided as a hole, and the second engaging piece 512 may be provided as a protrusion.

Hereinafter, an operation of the filter frame 5 having the above-described configuration will be described.

A user may transport the filter frame 5 in a folded state. In this case, the folded state of the filter frame 5 can be maintained without being converted to the unfolded state.

Specifically, when the filter frame 5 is in the folded state, the first support 11 and the second support 12 are arranged at the straight angle or are overlapped and arranged in parallel. In the first support 11 and the second support 12 arranged at the straight angle, the first locking piece 411 and the first engaging piece 511 are engaged and the first support 11 and the second support 12 are prevented from rotating with respect to each other. In addition, in the first support 11 and the second support 12 overlapped and arranged in parallel, the second locking piece 412 and the second engaging piece 512 are engaged and the first support 11 and the second support 12 are prevent from rotating with respect to each other.

Then, when an external force is applied to the first support 11 or the second support 12, the first engaging piece 511 is separated from the first locking piece 411, and the second locking piece 412 is separated from the second engaging piece 512. In this case, the first support 11 and the second support 12 are arranged at a predetermined angle. Subsequently, when an external force is continuously applied to the first support 11 or the second support 12, the first support 11 and the second support 12 are arranged to maximize the internal area of the loop-shaped path. In this case, the rotating part 300 of the second support 12 is caught by the locking protrusion 413 of the first support 11, so that the first support 11 and the second support 12 are prevented from rotating with respect to each other.

Meanwhile, in addition to the above-described configuration, according to a second embodiment of the present disclosure, the locking part 400 may include a stopper 421. Hereinafter, the second embodiment of the present disclosure will be described further with reference to FIGS. 7 and 8. The description of the second embodiment description will be made mainly on the difference compared with the above-described embodiment and the same descriptions and reference numerals are referred to the above-described embodiment.

The locking part 400 may include the stopper 421. The stopper 421 may be formed to selectively engage with a first fixture 521 and a second fixture 522, which will be described later. The stopper 421 may be formed on a side surface of the body part 100, and may be formed corresponding to the shape of the first fixture 521 and the second fixture 522. For example, the stopper 421 may be formed to protrude from the side surface of the body part so that the first fixture 521 or the second fixture 522 may be inserted therein. Accordingly, the first fixture 521 or the second fixture 522 may be selectively inserted in the stopper 421.

The engaging part 500 may include the first fixture 521 sand the second fixture 522 formed on an outer peripheral surface of the rotating part 300.

Figure 7:
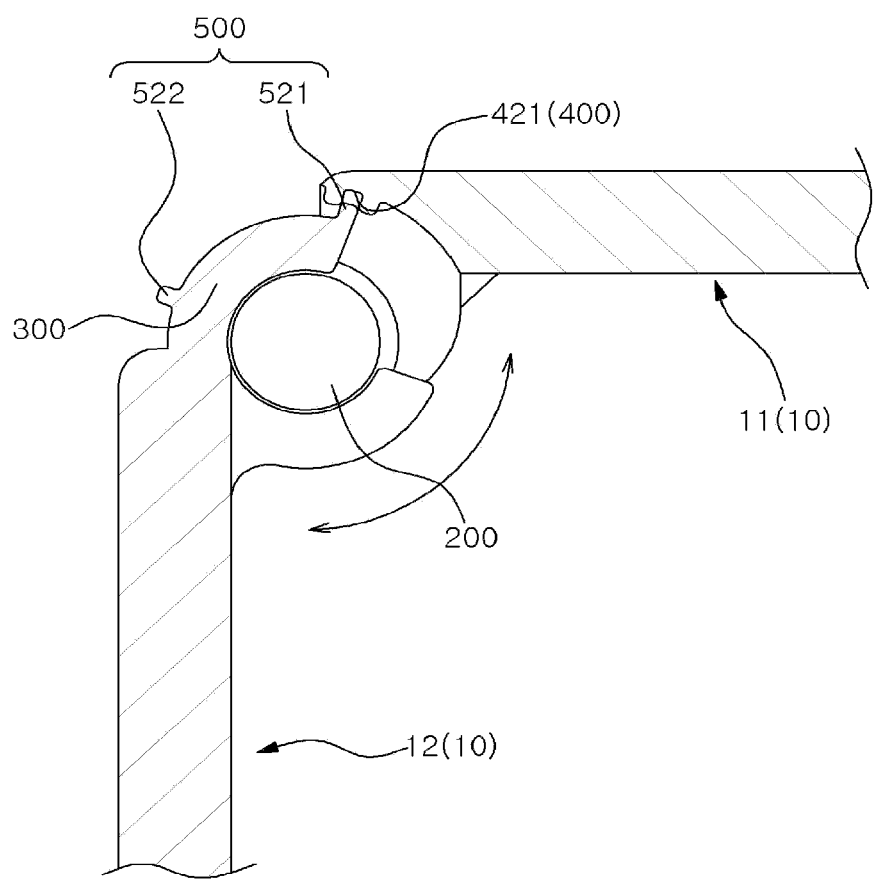
FIG. 7 is a partial cross-sectional view illustrating a state in which a first support and a second support of a filter frame according to a second embodiment of the present disclosure are arranged to maximize an internal area of a loop-shaped path.

Referring to FIG. 7, the first fixture 521 may be provided to prevent the first support and the second support 12 from rotating arbitrarily with respect to each other when the first support 11 and the second support 12 are arranged so that the internal area of the loop-shaped path is maximized. For example, the first fixture 521 may be a protrusion protruding from the outer circumferential surface of the rotation part 300. In addition, the first fixture 521 may selectively engage with the stopper 421.

Figure 8:
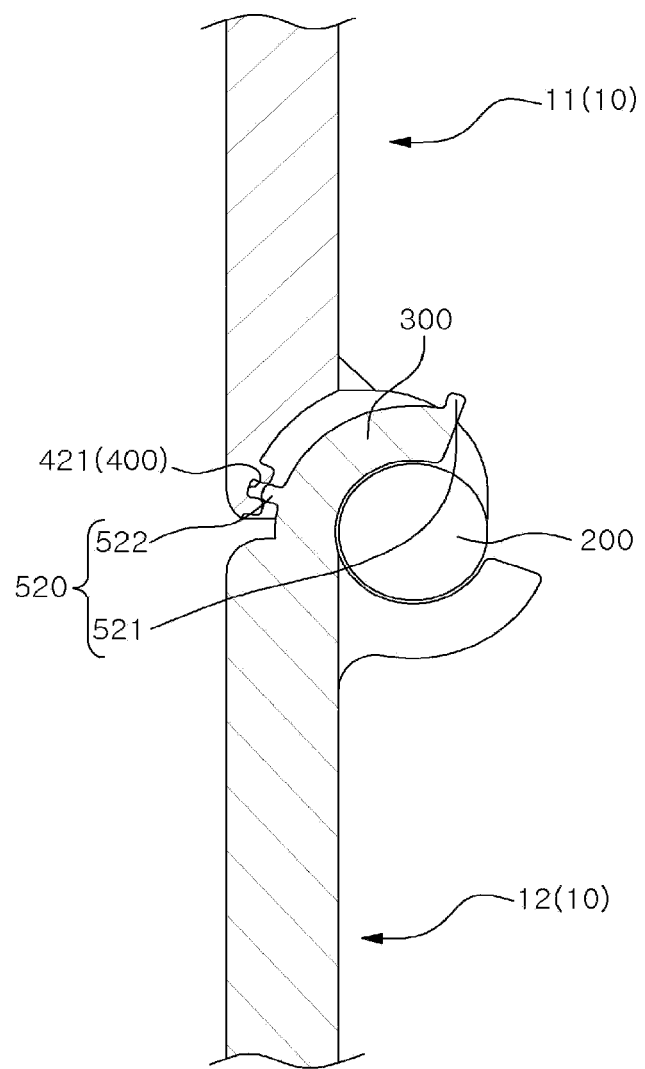
FIG. 8 is a partial cross-sectional view illustrating a state in which the first support and the second support in FIG. 7 are arranged at a straight angle.

Referring to FIG. 8, the second fixture 522 may be provided to prevent the first support 11 and the second support 12 from rotating arbitrarily with respect to each other when the first support 11 and the second support 12 are arranged at the straight angle. For example, the second fixture 522 may be a protrusion protruding from the outer circumferential surface of the rotating part 300. In addition, the second fixture 522 may selectively engage with the stopper 421. The second fixture 522 may be formed at a position spaced apart from the first fixture 521 by a predetermined distance along a circumferential direction of the rotating part 300.

Meanwhile, in addition to the above-described configuration, according to a third embodiment of the present disclosure, the locking part 400 may include a locking projection 431. Hereinafter, the third embodiment of the present disclosure will be described further with reference to FIGS. 9 to 11. The description of the third embodiment description will be made mainly on the difference compared with the above-described embodiments, and the same descriptions and reference numerals are referred to the above-described embodiments.

The locking part 400 may include a locking projection 431. The locking projection may selectively engage with the engaging part 500 to prevent the first support 11 and the second support 12 from rotating arbitrarily with respect to each other. For example, the locking projection 431 may be a projection protruding from a side surface of the shaft part 200. In addition the locking part 400 may rotate together with the shaft part 200.

The engaging part 500 may prevent the locking projection 431 from rotating more than a predetermined range by interfering with the locking projection 431. For example, the engaging part 500 may be a protrusion formed to protrude from an upper surface of the rotating part 300. In addition, the engaging part 500 may rotate together with the rotating part 300. The engaging part 500 may include a first protruding guide 531, a second protruding guide 532, and a third protruding guide 533.

Figure 9:
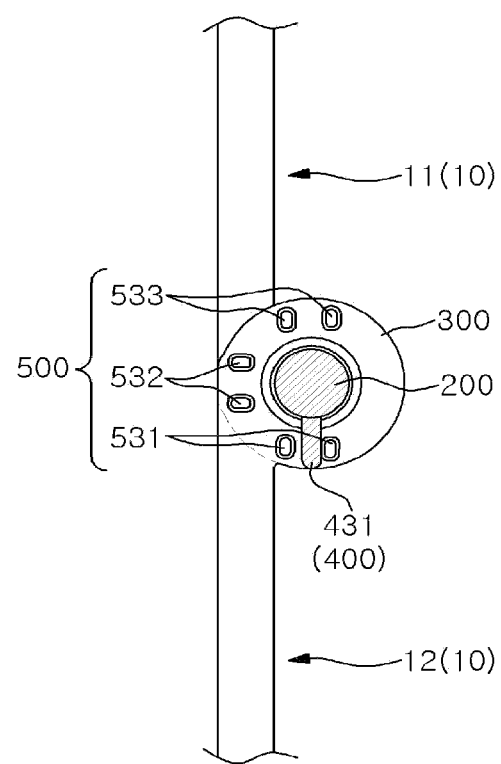
FIG. 9 is a partial cross-sectional view illustrating a state in which a first support and a second support of a filter frame according to a third embodiment of the present disclosure are arranged at a straight angle.

Referring to FIG. 9, the first protruding guide 531 may prevent the first support 11 and the second support 12 from rotating arbitrarily with respect to each other when the first support 11 and the second support 12 are arranged at the straight angle. For example, the first protruding guide 531 may include a plurality of first protruding guides 531, and the locking projection 431 may selectively be engaged between the plurality of first protruding guides 531. In addition, when the locking projection 431 is engaged between the plurality of first protruding guides 531, the angle between the first support 11 and the second support 12 is maintained at 180°, for example.

Figure 10:
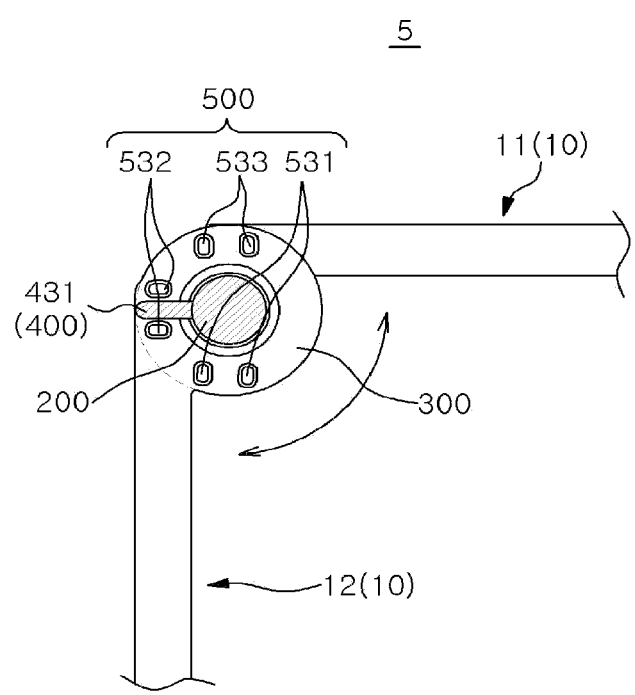
FIG. 10 is a partial cross-sectional view illustrating a state in which the first support and the second support in FIG. 9 are arranged to maximize an internal area of a loop-shaped path.

Referring to FIG. 10, the second protruding guide 532 may prevent the first support and the second support 12 from rotating arbitrarily with respect to each other when the first support 11 and the second support 12 are arranged so that the internal area of the loop-shaped path is maximized. For example, the second protruding guide 532 may include a plurality of second protruding guides 532, and the locking projection 431 may selectively be engaged between the plurality of second protruding guides 532. In addition, when the locking projection 431 is engaged between the plurality of second protruding guides 532, the angle between the first support 11 and the second support 12 is maintained at 90°, for example.

Figure 11:
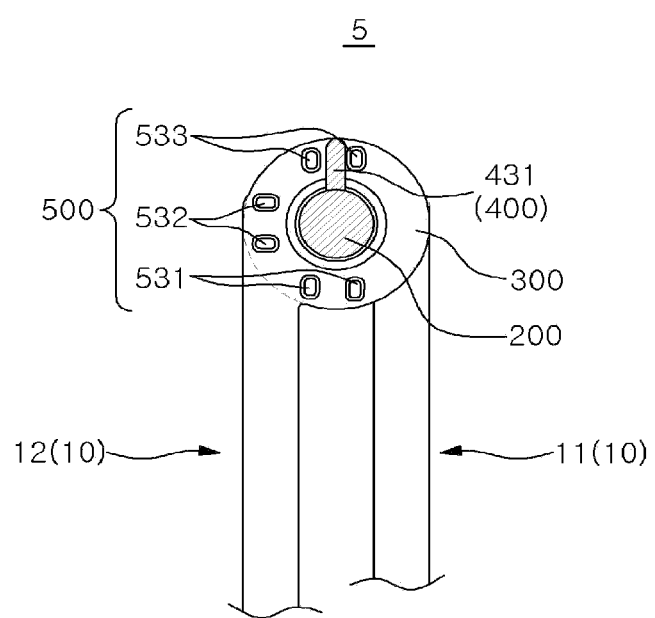
FIG. 11 is a partial cross-sectional view illustrating a state in which the first support and the second support of FIG. 9 overlap and are arranged in parallel.

Referring to FIG. 11, the third protruding guide 533 may prevent the first support 11 and the second support 12 from arbitrarily rotating with respect to each other when the first support 11 and the second support 12 are overlapped, to be arranged in parallel. For example, the third protruding guide 533 may include a plurality of third protruding guides 533, and the locking projection 431 may selectively be engaged between the plurality of third protruding guides 533. In addition, when the locking projection 431 is engaged between the plurality of third protruding guides 533, the angle between the first support 11 and the second support 12 is maintained at 0°, for example.

Meanwhile, in addition to the above-described configuration, according to a fourth embodiment of the present disclosure, the engaging part 500 may include a first groove 541, a second groove 542, and, a third groove 543. Hereinafter, the fourth embodiment of the present disclosure will be described further with reference to FIGS. 12 to 14. The description of the fourth embodiment description will be made mainly on the difference compared with the above-described embodiments, and the same descriptions and reference numerals are referred to the above-described embodiments.

The rotating part 300 may have a hole penetrating at least a portion of the center thereof, and a portion of the shaft part 200 may be inserted into the hole. In addition, the rotating part 300 may have an inner circumferential surface surrounding the shaft part 200.

The engaging part 500 may prevent the locking projection 431 from rotating more than a predetermined range by interfering with the locking projection 431. For example, the engaging part 500 may be a hole depressed by a predetermined depth from the inner circumferential surface of the rotating part 300. The engaging part 500 may include a first groove 541, a second groove 542, and a third groove 543. In addition, the first groove 541, the second groove 542, and the third groove 543 may be formed at positions spaced apart from each other by a predetermined distance along the circumferential direction of the rotating part 300.

Figure 12:
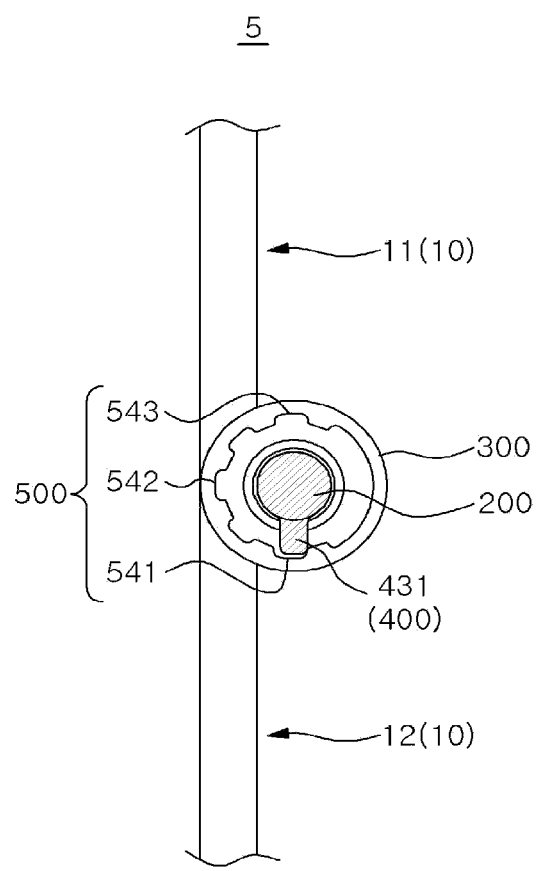
FIG. 12 is a partial cross-sectional view illustrating a state in which a first support and a second support of a filter frame according to a fourth embodiment of the present disclosure are arranged to form a straight angle.

Referring to FIG. 12, when the first support 11 and the second support 12 are arranged at the straight angle, the first groove 541 may prevent the first support 11 and the second support 12 from rotating arbitrarily with respect to each other. For example, when the first support 11 and the second support 12 are arranged at the straight angle, the locking projection 431 is engaged with the first groove 541. In this case, the angle between the first support 11 and the second, support 12 is maintained at 180°, for example.

Figure 13:
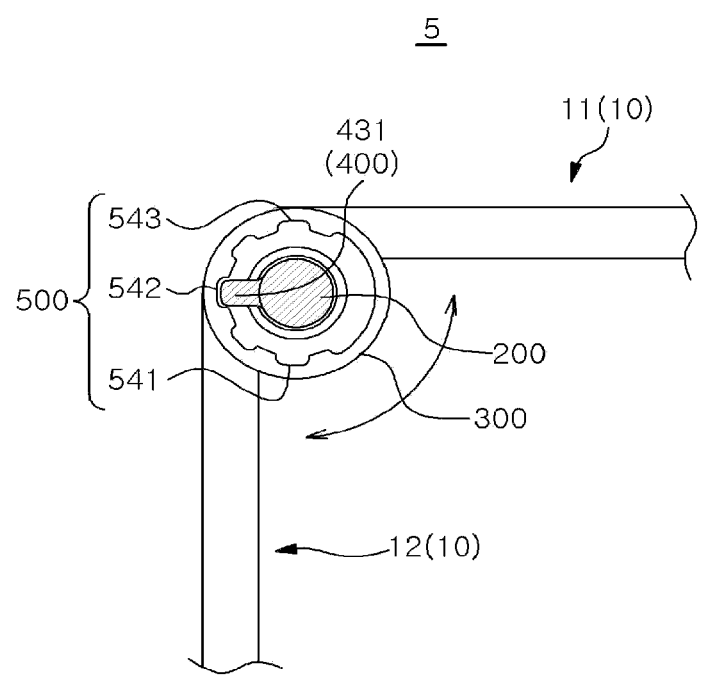
FIG. 13 is a partial cross-sectional view illustrating a state in which the first support and the second support in FIG. 12 are arranged to maximize an internal area of a loop-shaped path.

Referring to FIG. 13, the second groove 542 may, prevent the first support 11 and the second support 12 from rotating arbitrarily with respect to each other when the first support and the second support 12 are arranged so that the internal area of the loop-shaped path is maximized. For example, when the first support 11 and the second support 12 are arranged so that the internal area of the loop-shaped path is maximized, the locking projection 431 is engaged with the second groove 542. In this case, the angle between the first support 11 and the second support 12 is maintained at 90°, for example.

Figure 14:
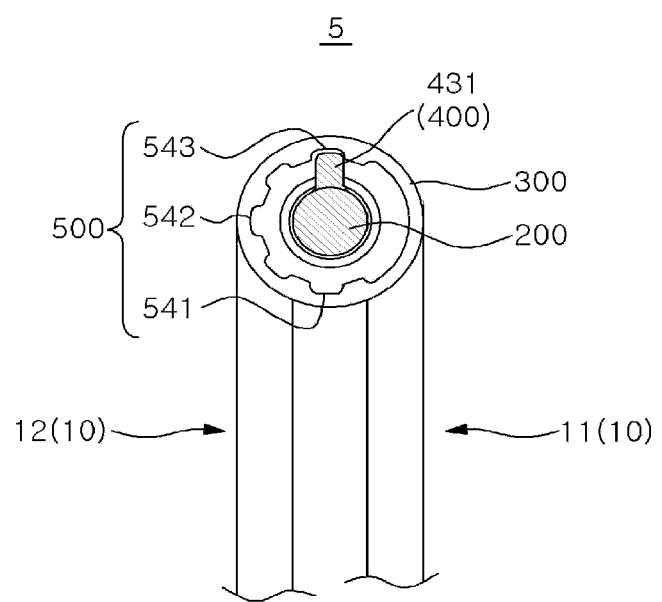
FIG. 14 is a partial cross-sectional view illustrating a state in which the first support and the second support in FIG. 12 are overlapped to be arranged in parallel.

Referring to FIG. 14, the third groove 543 may prevent the first support 11 and the second support 12 from rotating arbitrarily with respect to each other when the first support and the second support 12 are overlapped, and arranged in parallel. For example when the first support 11 and the second support 12 are overlapped and arranged in parallel, the locking projection 431 is engaged with the third groove 543. In this case, the angle between the first support 11 and the second support 12 is maintained, at 0°, for example.

Hereinafter, the effects of the filter frame 5 according to the first to fourth embodiments of the present disclosure will be described.

In the filter frame 5 in accordance with various embodiments of the present disclosure, when the filter frame 5 is transported in the folded state, the locking part 400 and the engaging part 500 are engaged to maintain the folded state. For this reason, the volume of the filter member 4 and the filter frame 5 can be minimized, and the filter member 4 and the filter frame 5 can be effectively transported.

In addition, when the filter frame 5 is unfolded and used after transportation, the rotating part 300 is caught by the locking protrusion 413, so that the filter frame 5 can be prevented from being arbitrarily folded. For this reason, it is possible to prevent the filter member 4 from rotating arbitrarily, thereby preventing the purification efficiency of the air purifier 1 from deteriorating. Further, it is possible to minimize damage to the filter frame 5 by preventing excessive rotation of the filter frame 5.

In addition, the locking part 400 and the engaging part 500 are disposed between the upper and lower ends of the vertical members 110 and 120, not the horizontal member 130, so that the first support 11 and the second support 12 can be more effectively prevented from rotating arbitrarily with respect to each other.

Further, the user can switch the filter frame 5 to the unfolded state or the folded state without applying much force.

As such, the filter frame 5 can be provided with a simple structure while providing the aforementioned effects, thereby reducing the manufacturing cost of the filter frame 5 and providing the economical filter frame 5.

Although the embodiments of the present disclosure have been described above as specific embodiments, this is only an example, and the present disclosure is not limited thereto and should be interpreted as having the widest range according to the technical idea disclosed in the present specification. Those skilled in the art may implement a pattern of a shape not described above by combining/replacing the disclosed embodiments, but this also does not deviate from the scope of the present disclosure. In addition, it is clear that those skilled in the art can easily change or modify the disclosed embodiments based on the present specification, and such changes or modifications also belong to the scope of the present disclosure.

What is claimed is:

1. A filter frame, comprising:
    a support supporting a filter member for air filtration, wherein
    the support includes a first support and a second support which are connected to each other to be rotatable with respect to each other, and
    each of the first support and the second support includes:
        a body part including a first vertical member extending in an up-down direction, a horizontal member having one end connected to the first vertical member to be perpendicular thereto, and a second vertical member connected to the other end of the horizontal member and extending in the up-down direction;
        a cylindrical shaft part connected to the first vertical member at a position between an upper end and a lower end of the first vertical member and extending in the up-down direction;
        a rotating part connected to the second vertical member at a position between an upper and a lower end of the second vertical member and formed to surround at least a portion of the shaft part;
        a locking part provided on at least one of the first vertical member and the shaft part; and
        an engaging part provided on at least one of the second vertical member and the rotating part, and formed to be engaged and fixed to the locking part,
    the rotating part of the second support is rotatably coupled to the shaft part of the first support,
    the locking part of the first support and the engaging part of the second support are engaged and fixed to each other to prevent the first support and the second support from freely rotating when the horizontal member of the first support and the horizontal member of the second support form a predetermined angle,
    the first support includes a plurality of the first supports and the second support includes a plurality of the second supports,
    the plurality of first supports and the plurality of second supports are continuously connected in such a manner that the shaft part of one of the first support and the second support and the rotating part of the other of the first support and the second support are rotatably engaged to each other,
    when each of the plurality of supports is rotated with respect to the support adjacent thereto to form an angle less than a straight angle with respect to an adjacent support, the plurality of supports are arranged along a loop-shaped path,
    when the first support and the second support are arranged to form the straight angle, when the first support and the second support overlap each other to be arranged in parallel, or when the first support and the second support are arranged so that an internal area of the loop-shaped path is maximized, the locking part of the first support and the engaging part of the second support are engaged and fixed to each other to prevent the first support and the second support from freely rotating with respect to each other,
    the locking part of the first support includes a first locking piece formed on a side surface of the body part and a second locking piece formed on an inner surface of the body part,
    the engaging part of the second support includes a first engaging piece formed on a side surface of the body part and a second engaging piece formed on an inner surface of the body part,
    when the first support and the second support are arranged to form the straight angle, the first locking piece and the first engaging piece are engaged, and
    when the first support and the second support overlap each other to be arranged in parallel, the second locking piece and the first engaging piece are engaged.

2. The filter frame of claim 1, wherein the locking part of the first support further includes a locking protrusion formed on an outer circumferential surface of the shaft part, and
    wherein when the first support and the second support are arranged so that the internal area of the loop-shaped path is maximized, the rotating part of the second support is caught on the locking protrusion of the first support to prevent the first support and the second support from freely rotating with respect to each other.

3. The filter frame of claim 1, wherein at least a portion of the locking part and the engaging part have a shape of a protrusion or hole.

4. A filter frame, comprising:
    a support supporting a filter member for air filtration, wherein
    the support includes a first support and a second support which are connected to each other to be rotatable with respect to each other, and
    each of the first support and the second support includes:
        a body part including a first vertical member extending in an up-down direction, a horizontal member having one end connected to the first vertical member to be perpendicular thereto, and a second vertical member connected to the other end of the horizontal member and extending in the up-down direction;

a cylindrical shaft part connected to the first vertical member at a position between an upper end and a lower end of the first vertical member and extending in the up-down direction;

a rotating part connected to the second vertical member at a position between an upper and a lower end of the second vertical member and formed to surround at least a portion of the shaft part;

a locking part provided on at least one of the first vertical member and the shaft part; and an engaging part provided on at least one of the second vertical member and the rotating part, and formed to be engaged and fixed to the locking part, the rotating part of the second support is rotatably coupled to the shaft part of the first support, the locking part of the first support and the engaging part of the second support are engaged and fixed to each other to prevent the first support and the second support from freely rotating when the horizontal member of the first support and the horizontal member of the second support form a predetermined angle, the first support includes a plurality of the first supports and the second support includes a plurality of the second supports, the plurality of first supports and the plurality of second supports are continuously connected in such a manner that the shaft part of one of the first support and the second support and the rotating part of the other of the first support and the second support are rotatably engaged to each other, when each of the plurality of supports is rotated with respect to the support adjacent thereto to form an angle less than a straight angle with respect to an adjacent support, the plurality of supports are arranged along a loop-shaped path, when the first support and the second support are arranged to form the straight angle, when the first support and the second support overlap each other to be arranged in parallel, or when the first support and the second support are arranged so that an internal area of the loop-shaped path is maximized, the locking part of the first support and the engaging part of the second support are engaged and fixed to each other to prevent the first support and the second support from freely rotating with respect to each other, the locking part of the first support includes a stopper formed on a side surface of the body part, the engaging part of the second support includes a first fixture and a second fixture formed on an outer peripheral surface of the rotating part, and the stopper is engaged with the first fixture when the first support and the second support are arranged so that the internal area of the loop-shaped path is maximized, and engaged with the second fixture when the first support and the second support are arranged at the straight angle.

5. A filter frame, comprising:

a support supporting a filter member for air filtration, wherein the support includes a first support and a second support which are connected to each other to be rotatable with respect to each other, and each of the first support and the second support includes:

a body part including a first vertical member extending in an up-down direction, a horizontal member having one end connected to the first vertical member to be perpendicular thereto, and a second vertical member connected to the other end of the horizontal member and extending in the up-down direction;

a cylindrical shaft part connected to the first vertical member at a position between an upper end and a lower end of the first vertical member and extending in the up-down direction;

a rotating part connected to the second vertical member at a position between an upper and a lower end of the second vertical member and formed to surround at least a portion of the shaft part;

a locking part provided on at least one of the first vertical member and the shaft part; and an engaging part provided on at least one of the second vertical member and the rotating part, and formed to be engaged and fixed to the locking part, the rotating part of the second support is rotatably coupled to the shaft part of the first support, the locking part of the first support and the engaging part of the second support are engaged and fixed to each other to prevent the first support and the second support from freely rotating when the horizontal member of the first support and the horizontal member of the second support form a predetermined angle, the first support includes a plurality of the first supports and the second support includes a plurality of the second supports, the plurality of first supports and the plurality of second supports are continuously connected in such a manner that the shaft part of one of the first support and the second support and the rotating part of the other of the first support and the second support are rotatably engaged to each other, when each of the plurality of supports is rotated with respect to the support adjacent thereto to form an angle less than a straight angle with respect to an adjacent support, the plurality of supports are arranged along a loop-shaped path, when the first support and the second support are arranged to form the straight angle, when the first support and the second support overlap each other to be arranged in parallel, or when the first support and the second support are arranged so that an internal area of the loop-shaped path is maximized, the locking part of the first support and the engaging part of the second support are engaged and fixed to each other to prevent the first support and the second support from freely rotating with respect to each other, the locking part of the first support includes a locking projection protruding from a side surface of the shaft part of the first support, wherein the engaging part of the second support includes a first protruding guide, a second protruding guide, and a third protruding guide which protrude from an upper surface of the rotating part of the second support, and the locking projection is engaged with the first protruding guide when the first support and the second support are arranged at the straight angle, engaged with the second protruding guide when the first support and the second support are arranged so that the internal area of the loop-shaped path is maximized, and engaged with the third protruding guide when the first support and the second support overlap each other to be arranged in parallel, or wherein the rotating part of the second support has an inner peripheral surface surrounding the shaft part of the first support, the engaging part of the second support includes a first groove, a second groove, and a third groove which are formed on an inner peripheral surface of the rotating part of the second support, and the locking projection is engaged with the first groove when the first support and the second support are arranged at the straight angle, engaged with the second groove when the first support and the second support are arranged such that the internal area of the loop-shaped path is maximized, and engaged with the third groove when the first support and the second support overlap each other to be arranged in parallel.

* * * * *